(12) United States Patent
Robinson et al.

(10) Patent No.: US 11,805,096 B2
(45) Date of Patent: *Oct. 31, 2023

(54) TECHNIQUE FOR RESTRICTING ACCESS TO INFORMATION

(71) Applicant: INTUIT INC., Mountain View, CA (US)

(72) Inventors: Rodney A. Robinson, Los Altos, CA (US); Joann Ferguson, Menlo Park, CA (US); Thomas J. Holodnik, Mountain View, CA (US); Thomas E. Dockman, Aurora, OH (US); Spencer W. Fong, Redwood City, CA (US); Michael P. Owen, Redwood City, CA (US)

(73) Assignee: INTUIT, INC., Mountain View, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 16/747,494

(22) Filed: Jan. 20, 2020

(65) Prior Publication Data

US 2020/0286078 A1    Sep. 10, 2020

Related U.S. Application Data

(63) Continuation of application No. 11/831,173, filed on Jul. 31, 2007, now Pat. No. 10,540,651.

(51) Int. Cl.
*H04L 9/40* (2022.01)
*G06Q 20/36* (2012.01)
(Continued)

(52) U.S. Cl.
CPC ............ *H04L 63/02* (2013.01); *H04L 63/029* (2013.01); *H04L 63/0227* (2013.01);
(Continued)

(58) Field of Classification Search
CPC . H04L 63/02; H04L 63/0227; H04L 63/0236; H04L 63/0281; H04L 63/029;
(Continued)

(56) References Cited

U.S. PATENT DOCUMENTS

| | | |
|---|---|---|
| 5,606,668 A | 2/1997 | Shwed |
| 5,701,463 A | 12/1997 | Malcolm |

(Continued)

OTHER PUBLICATIONS

Jammalamadaka et al., "Delegate: A Proxy Based Architecture for Secure Website Access from an Untrusted Machine," Proceedins of the 22nd Annual Computer Security Applications Conference (ACSAC '06), IEEE, 2006, all pages. (Year: 2006).

(Continued)

*Primary Examiner* — Farid Homayounmehr
*Assistant Examiner* — Suman Debnath
(74) *Attorney, Agent, or Firm* — Patterson + Sheridan, LLP (57) ABSTRACT

A system that communicates information is described. This system includes: a network interface, a proxy device coupled to the network interface, and an interface node coupled to the proxy device and configured to couple to a channel. Note that the network interface is configured to transmit outbound messages from the system to a location and to receive inbound messages to the system from the location, and the channel is configured to convey the outbound messages and the inbound messages. Moreover, the proxy device is configured to inspect a given message inbound or outbound based on a pre-determined profile of the location and pre-defined communication rules. Then, the proxy device is configured to restrict the given message based on a result of the inspection, where the restriction occurs after the system begins a communication session with the location and is performed for the duration of the communication session.

21 Claims, 5 Drawing Sheets

(51) Int. Cl.
*G06Q 20/38* (2012.01)
*G06Q 30/0283* (2023.01)

(52) U.S. Cl.
CPC ...... *H04L 63/0236* (2013.01); *H04L 63/0281* (2013.01); *G06Q 20/3674* (2013.01); *G06Q 20/382* (2013.01); *G06Q 30/0283* (2013.01)

(58) Field of Classification Search
CPC ............. G06Q 20/3674; G06Q 20/382; G06Q 30/0283
See application file for complete search history.

(56) References Cited

U.S. PATENT DOCUMENTS

| | | | |
|---|---|---|---|
| 5,826,267 A | 10/1998 | McMillan | |
| 5,835,726 A | 11/1998 | Shwed et al. | |
| 6,065,055 A | 5/2000 | Hughes et al. | |
| 6,268,856 B1 | 7/2001 | Bruck et al. | |
| 6,457,129 B2 | 9/2002 | O'Mahony | |
| 6,496,935 B1 | 12/2002 | Fink et al. | |
| 7,278,023 B1 | 10/2007 | Siegel et al. | |
| 2002/0069369 A1* | 6/2002 | Tremain | H04L 63/1408 709/224 |
| 2004/0260776 A1* | 12/2004 | Starbuck | H04L 51/212 709/206 |
| 2005/0050150 A1* | 3/2005 | Dinkin | G06Q 10/107 709/207 |
| 2006/0178910 A1* | 8/2006 | Eisenberger | G16H 40/67 705/26.1 |
| 2007/0245409 A1* | 10/2007 | Harris | H04L 67/568 726/5 |
| 2008/0066173 A1* | 3/2008 | Moran | H04L 63/101 726/12 |
| 2008/0154758 A1* | 6/2008 | Schattmaier | G06Q 40/00 705/35 |

OTHER PUBLICATIONS

Microsoft Press Computer Dictionary Third Edition 1997, Microsoft Press, 3rd ed., p. 239.

* cited by examiner

TECHNIQUE FOR RESTRICTING ACCESS TO INFORMATION

CROSS REFERENCE TO RELATED APPLICATIONS

This application is a continuation of and hereby claims priority under 35 U.S.C. § 120 to pending U.S. patent application Ser. No. 11/831,173, filed on Jul. 31, 2007, the contents of which are incorporated herein in their entirety. This application is also related to U.S. patent application Ser. No. 11/350,168, filed on Feb. 8, 2006, the contents of which are incorporated herein in their entirety.

BACKGROUND

The present invention relates to techniques for restricting access to information during communications between a computer system and a remote location.

Outsourcing is an increasingly common technique for reducing expenses and focusing the activities of an organization. However, it is often difficult to outsource tasks or activities that involve sensitive customer information, such as financial information or health-care information. This is because it is very hard for the organization that is outsourcing the activities to ensure that a third party has implemented appropriate safeguards to protect such sensitive customer information. Consequently, the organization is reluctant to outsource the activities because, in the wrong hands, the sensitive customer information may result in identity theft or violations of governmental regulations that protect privacy (such as the Health Insurance Portability and Accountability Act). Moreover, such violations may result in financial liability for the organization.

SUMMARY

One embodiment of this invention relates to a system that communicates information. This system includes: a network interface, a proxy device coupled to the network interface, and an interface node coupled to the proxy device and configured to couple to a channel. Note that the network interface is configured to transmit outbound messages from the system to a location and to receive inbound messages to the system from the location, and the channel is configured to convey the outbound messages and the inbound messages. Moreover, the proxy device is configured to inspect a given message inbound or outbound based on a pre-determined profile of the location and pre-defined communication rules. Then, the proxy device is configured to restrict the given message based on a result of the inspection, where the restriction occurs after the system begins a communication session with the location and is performed for the duration of the communication session.

In some embodiments, the location includes at least a portion of a web page and/or at least a portion of a website, where the website includes multiple web pages.

In some embodiments, the restriction limits the given message to only include information at the location which is associated with a task. Moreover, the restriction may facilitate outsourcing of the task to a third party. Note that in some embodiments the task involves creating or maintaining scripts to aggregate at least a portion of additional information included in the inbound messages from the location.

In some embodiments, the given message includes financial information associated with an account, where the restriction prevents unauthorized accesses to protected financial information during the communication session. Moreover, in some embodiments the given message includes health information associated with an account, where the restriction prevents unauthorized accesses to protected health information during the communication session.

In some embodiments, the proxy device is configured to log the given message during the communication session. Moreover, the proxy device may be configured to alert an administrator of the system if an attempt is made to violate the pre-defined communication rules during the communication session.

In some embodiments, the pre-defined communication rules include privileges associated with a given user of the system during the communication session. For example, the privileges may be based on a location of the given user.

In some embodiments, the pre-determined profile includes a context and a format of the information at the location.

In some embodiments, the restriction prevents modification of the information at the location based on information in the outbound message.

In some embodiments, the restriction involves masking at least a portion of the given message so that information associated with the portion is not transmitted to the location or received from the location. Moreover, the restriction may involve preventing the given message from triggering access to at least a portion of the location.

In some embodiments, the inspection involves using a filter and one or more pre-determined patterns. Moreover, the inspection may involve parsing the given message based on additional context for the information in the given message. And in some embodiments the inspection involves detecting the presence of yet additional information in the given message and/or the absence of other information in the given message.

Another embodiment provides a method for communicating information between the system and the location, which may be performed by the system. During operation, the system receives the given message, where the given message can include the outbound message from the system to the location or the inbound message from the location to the system. Next, the system inspects the given message based on the pre-determined profile of the location and the pre-defined communication rules. Then, the system restricts the given message based on a result of the inspection, where the restriction occurs after the system begins the communication session with the location and is performed for the duration of the communication session.

Another embodiment relates to a computer program product for use in conjunction with the system. This computer program product may include instructions corresponding to at least some of the above-described operations.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems, software, and processes may be used to restrict access to information during communication between the computer system and a location, such as a website or web page that includes sensitive or protected financial information and/or sensitive or protected health-care information.

In particular, a proxy device may be inserted between the computer system and the location. This proxy device may inspect messages communicated between the computer system and the location based on a pre-determined profile of the location and pre-defined communication rules. For example, the pre-determined profile may include a context and/or a format of information at the location, i.e., the inspection may be based on advanced knowledge of information at the location and the interrelationships within this information.

Moreover, the pre-defined communication rules may include privileges and/or allowed activities associated with a given user of the system during a communication session. For example, different types of users may be defined by an administrator of the system and, as described below, based on the types the given user may be prevented from unauthorized viewing of customer information and/or unauthorized initiation of transactions in customer accounts.

In particular, the proxy device may restrict a given message based on a result of the inspection. For example, the restriction may involve masking a portion of the given message and/or preventing the given message from triggering access to at least a portion of the location. Note that the restriction occurs after the system begins a communication session with the location and is performed for the duration of the communication session.

These techniques may, at least in part, be implemented as a stand-alone software application, or as a program module or subroutine in another application. Furthermore, at least a portion of a program associated with the proxy device may be configured to execute on a client computer (such as a personal computer, a laptop computer, cell phone, PDA, or other device capable of manipulating computer readable data) or remotely from a client computer via associated computing systems over a network (such as the Internet, Intranet, LAN, WAN, MAN, or combination of networks, or other technology enabling communication between computing systems). Therefore, the pre-defined communication rules and/or the pre-determined profiles may be stored locally (for example, on a local computer) and/or remotely (for example, on a computer or server that is accessed via a network).

By selectively restricting access to information, this technique may allow an organization to outsource to third parties activities or tasks associated with locations that include protected information. In particular, the proxy device may allow these third parties to access the locations to perform the tasks without allowing the third parties to access or modify the protected information, thereby according the organizations the benefits of outsourcing while reducing or eliminating potential security risks.

Figure 1A:
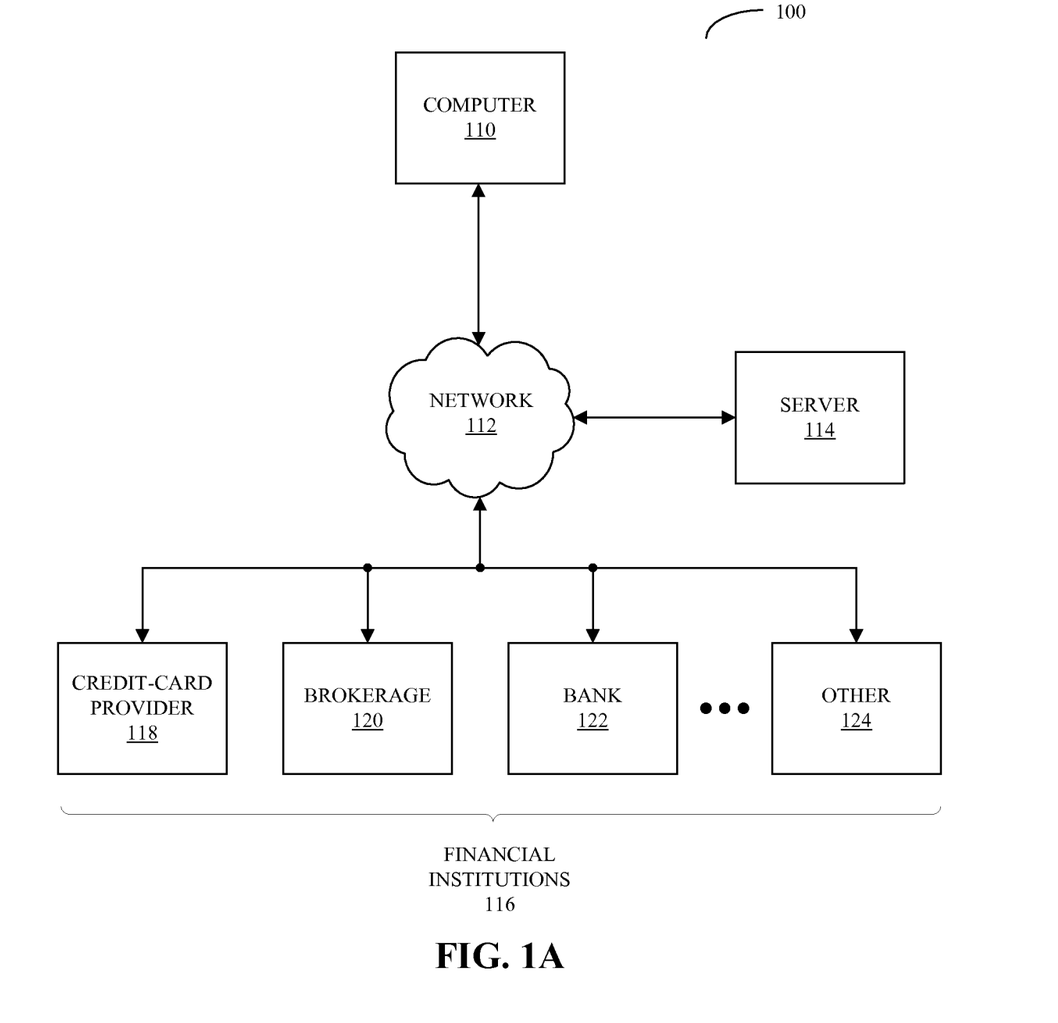
FIG. 1A is a block diagram illustrating a computer system including computers and servers that are networked together in accordance with an embodiment of the present invention.

We now describe embodiments of systems, devices, and processes for communicating information. FIG. 1A presents a block diagram illustrating an embodiment of a computer system 100 including computers and servers that are networked together. Note that this network may include one or more communication channels (also referred to as channels) or links, which convey information between at least two locations (such as two computers) using point-to-point or multi-point communication.

This system may be used to collect or aggregate information associated with a client or customer from one or more entities, such as financial institutions 116. For example, the financial institutions 116 may include: a credit-card provider 118, a brokerage 120, a bank 122, and/or another institution 124 (such as a governmental agency or a payroll organization). Note that the aggregated information may be used for a wide variety of purposes, such as: completing a loan application, preparing an income tax return, and/or for accounting purposes.

In particular, a given customer may provide the computer system 100 with one or more account numbers for accounts at one or more of the financial institutions 116, as well as associated identifiers, such as: the customer's name, the customer's social security number, and/or account passwords. Then, the computer system 100 may automatically aggregate the information without further action by the given customer. For example, aggregation software that executes in the computer system (such as on server 114) may use network 112 to access financial records at one or more of the financial institutions 116 and may aggregate the customer information. Note that the aggregation software may be a stand-alone application on the computer 110 and/or may be embedded in another application. Therefore, in some embodiments the aggregation software may be included or embedded in income-tax preparation software and/or financial-accounting software, such as Quicken™, QuickBooks™ and/or TurboTax™.

In some embodiments, the aggregation software uses one or more aggregation scripts while aggregating information from a given financial institution. These aggregation scripts may be developed in advance of the aggregation based on knowledge about the given financial institution, such as the context of the data (for example, how data is arranged and where the relevant data is located) and/or the format(s) of the data. Note that a user of the computer system 100 (such as a scripting engineer) may create or (as discussed below) maintain the given aggregation script using a stand-alone scripting program that executes on computer 110 or a scripting module that is embedded in another application.

Unfortunately, the aggregation scripts may not always work as intended. For example, there may be a bug or defect in a given aggregation script and/or the information at the given financial institution may change (such as when a website is updated). Consequently, there may be a need for the scripting engineer) to maintain the aggregation scripts.

In order to modify the given aggregation script, the scripting engineer often needs current knowledge or information about a given web page or website (which may include multiple web pages), such as the aforementioned context and format information. Typically, the scripting engineer obtains this information by accessing live websites associated with the financial institutions 116.

However, this type of access posses risks for a provider of the computer system 100. In particular, if the scripting engineer also has access to the one or more account numbers and the associated identifiers, the scripting engineer may be able to view sensitive customer information (such as financial information and/or health-care information) and/or may initiate transactions in customer accounts without authorization. For example, the scripting engineer may: change a name associated with an account, may transfer funds, and/or may add new services. These risks may outweigh the advantages associated with outsourcing the scripting engineering function, thereby preventing the provider of the computer system 100 from reducing expenses and/or focusing activities on core strengths.

Figure 1B:
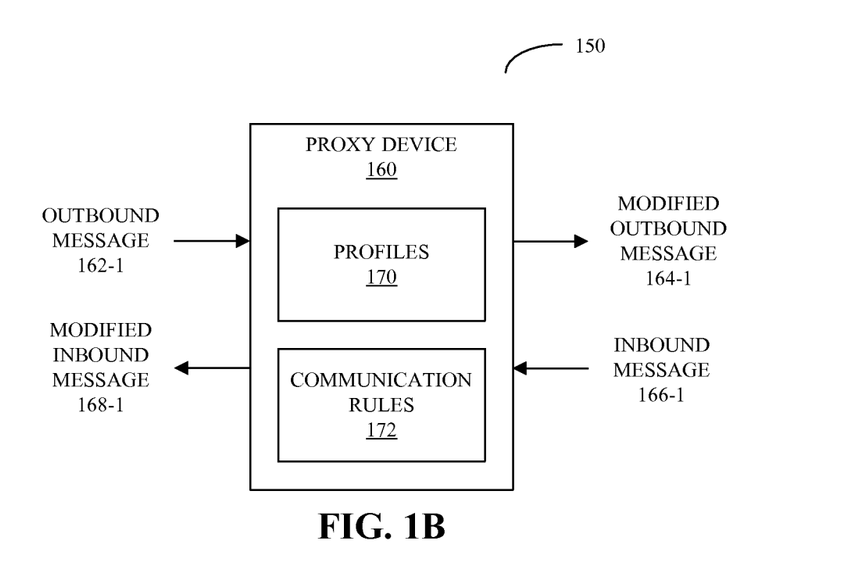
FIG. 1B is a block diagram illustrating a proxy device for use in a computer system in accordance with an embodiment of the present invention.

A technique for addressing this challenge is shown in FIG. 1B, which provides a block diagram illustrating an embodiment 150 of a proxy device 160 for use in the computer system 100 (FIG. 1A). For example, the proxy device 160 may be inserted between the computer 110 (FIG. 1A) and the network 112 (FIG. 1A) and/or between the server 114 (FIG. 1A) and the network 112 (FIG. 1A). In some embodiments, all communications with the financial institutions 116 (FIG. 1A), including those from computer 110, are first routed through the server 114 (FIG. 1A), and the proxy device 160 is positioned between the server 114 (FIG. 1A) and the network 112 (FIG. 1A).

Proxy device 160 may process outbound messages (such as outbound message 162-1) from the server 114 (FIG. 1A) to a location (such as at least a portion of a web page or at least a portion of a website associated with a given financial institution). Moreover, proxy device 160 may process inbound messages (such as inbound message 166-1) from the location to the server 114 (FIG. 1A).

During this processing, the proxy device 160 may inspect a given message based on one or more pre-determined profiles 170 of the location and/or one or more pre-defined communication rules 172. Based on a result of the inspection, the proxy device 160 may restrict the given message. For example, the restriction may involve filtering the given message (such as masking at least a portion of the given message) and/or blocking the given message (such that the given message cannot trigger access to a uniform resource locator or URL, or a portion of a URL). Consequently, after passing through the proxy device 160, the outbound message 162-1 may become modified outbound message 164-1 and/or the inbound message 166-1 may become modified inbound message 168-1.

Note that restriction may occur after the computer system 100 (FIG. 1A) begins a communication session with the location, for example, after the scripting engineer has accessed a web page or website associated with the given financial institution. Moreover, the inspection and/or restriction of messages (inbound and/or outbound) may be performed for the duration of the communication session.

In some embodiments, the given message includes financial information associated with an account, and the restriction prevents unauthorized accesses to protected financial information during the communication session. Moreover, in some embodiments the given message includes health information associated with an account, and the restriction prevents unauthorized accesses to protected health information during the communication session. Consequently, the techniques illustrated in FIG. 1B may be used to ensure compliance with regulations such as the Health Insurance Portability and Accountability Act (HIPAA).

In some embodiments, the pre-determined profiles 170 include the context and format of information at the location. For example, the pre-determined profiles 170 may indicate: portions of one or more web pages at a website that include information to be aggregated; relationships between this information and other information at the website; and/or a format of this information. Thus, the pre-determined profiles 170 may indicate what type of information may be accessed and where this information is located.

In some embodiments, the pre-defined communication rules 172 include privileges associated with a given user of the computer system 100 (FIG. 1A) during the communication session. For example, there may be three different levels of control or privileges associated with the users, including privileges for: scripting engineers, site profile managers, and administrators. In these embodiments, the scripting engineers may be restricted from accessing and/or changing sensitive customer information. In contrast, site profile managers (who define the pre-determined profiles 170) and administrators (who manage the roles of the other users and/or adds new users) may have more access to at least some sensitive customer information. Note that in some embodiments, the privileges may be based on a location of the given user. For example, if a function (such as that of the scripting engineer) is outsourced, the privileges associated with this type of user may be reduced, i.e., the highest level of control may be applied to remotely located scripting engineers.

Moreover, the pre-defined communication rules 172 may include rules for inbound messages and rules for outbound messages. In an exemplary embodiment, the inbound rules include blocking access to portions of a website associated with transferring funds or opening an account, and/or preventing access to customer financial information, such as brokerage account details or the net worth of a customer.

In another exemplary embodiment, the outbound rules include words or operations that are not allowed, such as: changing an email address, changing a contact address, computing the net worth of a customer, and/or paying bills. However, the outbound rules may include words or operations that are allowed, such as requesting a detailed description of a web page. Therefore, the inspection of the given message may include checking for positive features or attributes (i.e., allowed words or operations) and/or negative features (i.e., words or features that are not allowed). For example, the inspection may return a positive result (i.e., that restriction is required) if some information is found in the given message and/or other information is absent.

Inspection of the messages may be implemented using a variety of techniques. In some embodiments, the given message is inspected based on Hypertext Transfer Protocol (HTTP) headers and/or Hypertext Markup Language (HTML) forms, which can include information that is and/or is not displayed in a browser. For example, the data stream may be inspected for phrases such as "change name." Moreover, the URL may be inspected. Thus, in some embodiments filters are used to look for data patterns (including patterns in text, graphics and/or images). In this way, the proxy device 160 can inspect messages that include data in a variety of formats, such as: Ostensible Markup Language, Extensible Markup Language, and/or Adobe Acrobat.

However, in some embodiments inspection is performed using intelligent HTML parsing, in which a context of the data is used to identify suspicious words, phrases, and/or operations. Moreover, in some embodiments, matching techniques may be used. For example, the given message may be compared to an expression, which includes logical permutations on key words, synonyms, and/or paraphrases.

In some embodiments, the pre-defined communication rules 172 may be programmable, allowing portions of the messages to be adaptively detected or ignored. Moreover, in some embodiments the pre-defined communication rules 172 may be updated, for example, based on data mining, machine learning or artificial intelligence techniques that determine signatures or patterns associated with suspicious activity in the computer system 100 (FIG. 1A).

Similarly, restriction of messages may be implemented using a variety of techniques, such as filters. For example, by filtering outbound message 162-1, modified outbound message 164-1 may be unable to modify information at the location. Thus, restriction may prevent modification of information at the location.

Using the proxy device 160, computer system 100 (FIG. 1A) may allow the script engineer to access the minimum features/web pages in a website. This access may facilitate the creation and/or maintaining of aggregation scripts without the previously described risks. Consequently, use of the proxy device 160 and the related techniques may facilitate outsourcing of activities, such as the script engineering function.

While messages including financial and/or health care information have been used as illustrative embodiments, these techniques may be applied to a wide variety of environments and types of data which can be accessed at structured websites or web pages.

In some embodiments the computer system 100 (FIG. 1A) and/or the proxy device 160 include fewer or additional components. Moreover, two or more components can be combined into a single component, and/or a position of one or more components may be changed. For example, when aggregating information the proxy device 160 may transparently substitute dummy information for customer account information in messages so that users of the computer system 100 (such as the scripting engineers) cannot view account numbers or customer identifiers, which may then be used to access or modify customer information in other computer systems that do not include the proxy device 160. In some embodiments, the proxy device 160 and/or the computer system 100 (FIG. 1A) generate an audit trail (such as a log) of the messages and provide alerts if an attempt is made to violate the pre-defined communication rules 172 during the communication session.

Figure 2:
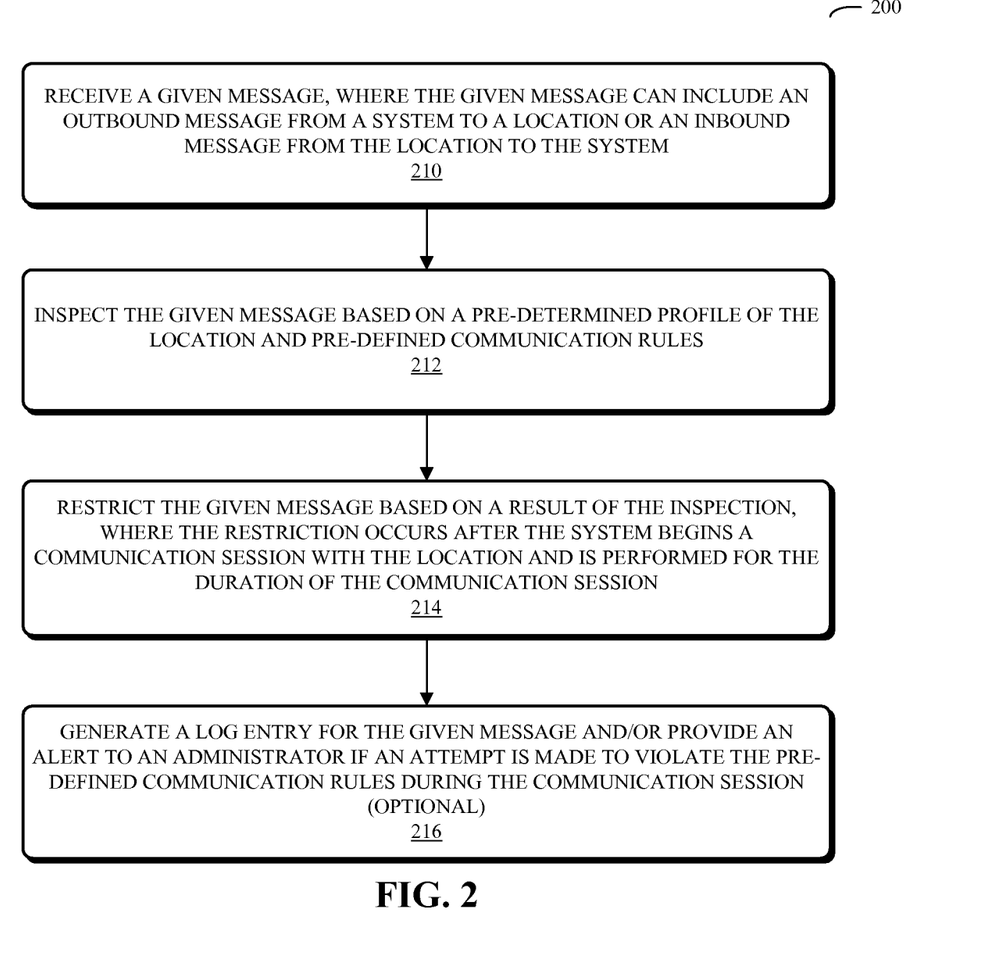
FIG. 2 is a flow chart illustrating a method for communicating information between a computer system and a location in accordance with an embodiment of the present invention.

We now discuss methods for communicating information. More specifically, FIG. 2 is a flow chart illustrating an embodiment of a method 200 for communicating information between a computer system (such as the computer system 100 in FIG. 1A) and a location. During operation, the system receives the given message (210), where the given message can include the outbound message from the system to the location or the inbound message from the location to the system. Next, the system inspects the given message based on the pre-determined profile of the location and the pre-defined communication rules (212). Then, the system restricts the given message based on a result of the inspection (214), where the restriction occurs after the system begins the communication session with the location and is performed for the duration of the communication session.

In some embodiments, the system optionally logs the given message during the communication session and/or optionally alerts an administrator of the system if an attempt is made to violate the pre-defined communication rules during the communication session (216).

Note that in some embodiments of the method 200 there may be: additional or fewer operations; the order of the operations may be changed; and two or more operations may be combined into a single operation.

Figure 3:
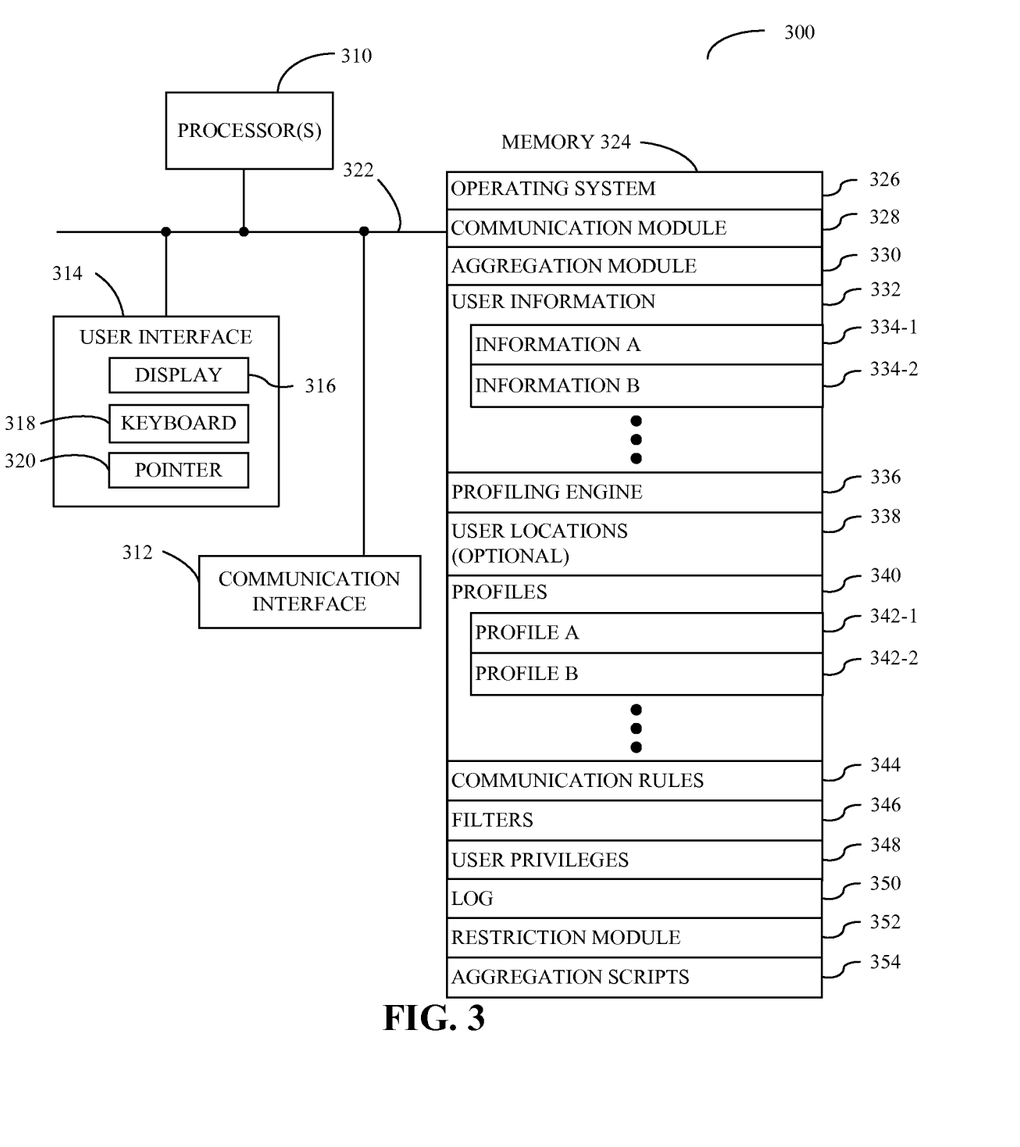
FIG. 3 is a block diagram illustrating a computer system in accordance with an embodiment of the present invention.

We now describe computer systems for implementing these techniques. FIG. 3 presents a block diagram illustrating an embodiment of a computer system 300. Computer system 300 includes: one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, FLASH, one or more smart cards, one or more magnetic disc storage devices, and/or one or more optical storage devices. Memory 324 may store an operating system 326 that includes procedures (or a set of instructions) for handling various basic system services for performing hardware dependent tasks. While not shown in the computer system 100, in some embodiments memory 324 includes a browser. Memory 324 may also store communication procedures (or a set of instructions) in a communication module 328. These communication procedures may be used for communicating with one or more computers and/or servers, including computers and/or servers that are remotely located with respect to the computer system 300.

Memory 324 may include multiple program modules (or a set of instructions), including aggregation module 330 (or a set of instructions), profiling engine 336 (or a set of instructions), and/or restriction module 352 (or a set of instructions). Aggregation module 330 may use aggregation scripts 354 to aggregate user information 332 (such as information A 334-1 and/or information B 334-2).

Moreover, profiling engine 336 may inspect messages transmitted and/or received by communication module 328. This inspection may be based on profiles 340 (such as profile A 342-1 and/or profile B 342-2) and/or communication rules 344. In some embodiments, the inspection is also based on user privileges 348, which may be based on optional user locations 338. Note that in some embodiments the user privileges 348 are included in the communication rules 344.

If a violation of one or more of the profiles 340 and/or the communication rules 344 occurs, and/or if a suspicious message is detected, the restriction module 352 may restriction one or more messages. For example, one or more filters 346 may be used to mask and/or block information in the one or more messages.

In some embodiments, profiling engine 336 maintains a log 350 of the messages that are transmitted and/or received. Moreover, if an administrator may be alerted if a violation of the communication rules 344 and/or a suspicious message is detected.

Instructions in the various modules in the memory 324 may be implemented in a high-level procedural language, an object-oriented programming language, and/or in an assembly or machine language. The programming language may be compiled or interpreted, i.e., configurable or configured to be executed by the one or more processing units 310.

Although the computer system 300 is illustrated as having a number of discrete components, FIG. 3 is intended to provide a functional description of the various features that may be present in the computer system 300 rather than as a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more ASICs and/or one or more digital signal processors DSPs.

Computer system 300 may include: fewer components or additional components, two or more components may be combined into a single component, and/or a position of one or more components may be changed. In some embodiments the functionality of the computer system 300 may be implemented more in hardware and less in software, or less in hardware and more in software, as is known in the art.

Figure 4:
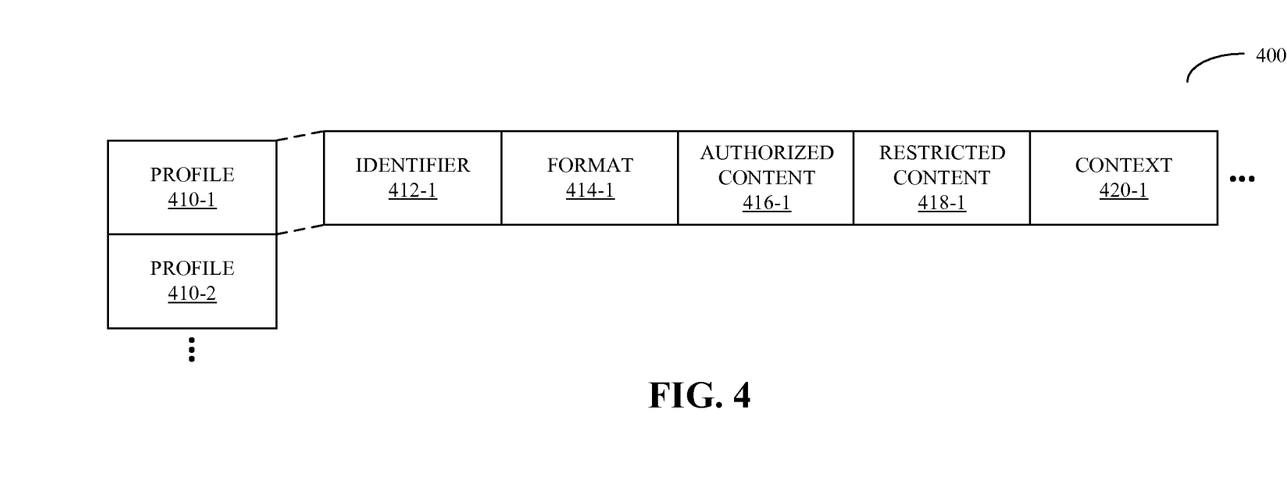
FIG. 4 is a block diagram illustrating a data structure in accordance with an embodiment of the present invention.

We now describe data structures that may be used in the computer system 100 (FIG. 1A), the proxy device 160 (FIG. 1B), and/or computer system 300. FIG. 4 is a block diagram illustrating an embodiment of a data structure 400. This data structure may include information for one or more profiles 410, such as those associated with locations. A given profile, such as profile 410-1, may include an identifier for a location (such as a URL) 412-1. Moreover, the profile 410-1 may include a format 414-1 and/or context 420-1 of data at the location, as well as authorized content 416-1 and/or restricted content 418-1 at the location.

Figure 5:
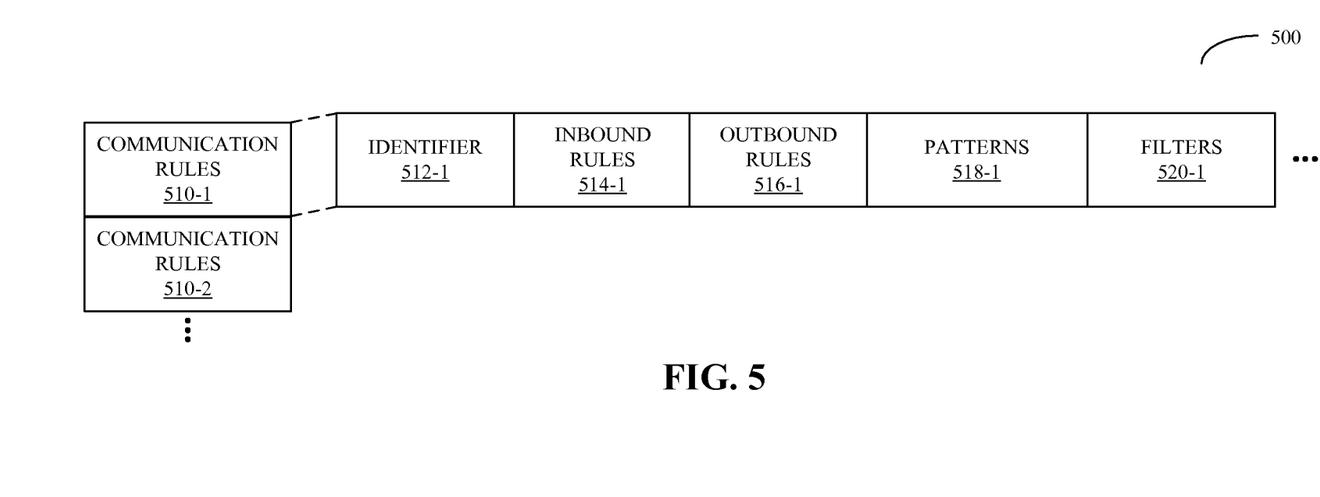
FIG. 5 is a block diagram illustrating a data structure in accordance with an embodiment of the present invention.

FIG. 5 is a block diagram illustrating an embodiment of a data structure 500. This data structure may include information for one or more communication rules 510. A given communication rule, such as commercial rule 510-1, may include an identifier for a location (such as a URL) 512-1. Moreover, the communication rule 510-1 may include: inbound rules 514-1, outbound rules 516-1, patterns 518-1 to be detected, and/or filters 520-1 to use to detect the patterns 518-1 and/or to restrict the messages.

Note that that in some embodiments of the data structures 400 (FIG. 4) and/or 500 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating information between a computer and a server via a computer-implemented proxy device, comprising:
receiving, by the computer-implemented proxy device, a message directed to the server from a second user, wherein the message includes a request for information associated with a first user account that is associated with a first user, wherein the second user is different from the first user, and wherein the message comprises one or more graphics or images;
inspecting, by the computer-implemented proxy device, the message from the second user based on one or more pre-determined profiles and one or more pre-defined communication rules comprising a filter, wherein the inspecting comprises looking for data patterns in the one or more graphics or images in the message using the filter;
determining, based on the inspecting, that the message includes a request that violates a pre-defined communication rule for the second user;
in response to determining that the message includes the request that violates the pre-defined communication rule for the second user, filtering the message by the computer-implemented proxy device to produce a filtered message before sending the filtered message to the server; and
in response to determining that the message includes a request for information that is restricted from the second user, generating a filtered return message and sending the filtered return message to the second user, wherein the filtered return message is generated by substituting dummy information for restricted information associated with the request.

2. The method of claim 1, wherein the request comprises modifying the information associated with the first user account.

3. The method of claim 1, wherein the request comprises creating or maintaining scripts to aggregate additional information included in inbound messages to the server.

4. The method of claim 1, wherein the information associated with the first user account includes financial information of the first user.

5. The method of claim 1, wherein the information associated with the first user account includes health information of the first user.

6. The method of claim 1, wherein the computer-implemented proxy device is configured to log the message.

7. The method of claim 1, wherein the computer-implemented proxy device is configured to alert an administrator if an attempt is made to violate the one or more pre-defined communication rules.

8. The method of claim 1, further comprising, in response to determining that the request includes performing a task that is restricted from the second user, preventing the second user from performing the task that is restricted from the second user by filtering the message by the computer-implemented proxy device to produce a filtered message before sending the filtered message to the server, the task that is restricted from the second user being restricted based on one or more pre-determined profiles of the second user and including a selection of one or more of: accessing account information, transferring account funds, opening an account, or changing account information.

9. A system comprising one or more processors and a non-transitory computer-readable medium comprising instructions that, when executed by the one or more processors, cause the system to perform a method for communicating information between a computer and a server via a computer-implemented proxy device, the method comprising:
receiving, by the computer-implemented proxy device, a message directed to the server from a second user, wherein the message includes a request for information associated with a first user account that is associated with a first user, wherein the second user is different from the first user, and wherein the message comprises one or more graphics or images;

inspecting, by the computer-implemented proxy device, the message from the second user based on one or more pre-determined profiles and one or more pre-defined communication rules comprising a filter, wherein the inspecting comprises looking for data patterns in the one or more graphics or images in the message using the filter;

determining, based on the inspecting, that the message includes a request that violates a pre-defined communication rule for the second user;

in response to determining that the message includes the request that violates the pre-defined communication rule for the second user, filtering the message by the computer-implemented proxy device to produce a filtered message before sending the filtered message to the server; and in response to determining that the message includes a request for information that is restricted from the second user, generating a filtered return message and sending the filtered return message to the second user, wherein the filtered return message is generated by substituting dummy information for restricted information associated with the request.

10. The system of claim 9, wherein the request comprises modifying the information associated with the first user account.

11. The system of claim 9, wherein the request comprises creating or maintaining scripts to aggregate additional information included in inbound messages to the server.

12. The system of claim 9, wherein the information associated with the first user account includes financial information of the first user.

13. The system of claim 9, wherein the information associated with the first user account includes health information of the first user.

14. The system of claim 9, wherein the computer-implemented proxy device is configured to log the message.

15. The system of claim 9, wherein the computer-implemented proxy device is configured to alert an administrator if an attempt is made to violate the one or more pre-defined communication rules.

16. A non-transitory computer-readable medium comprising instructions that, when executed by one or more processors of a computing system, cause the computing system to perform a method for communicating information between a computer and a server via a computer-implemented proxy device, the method comprising:

receiving, by the computer-implemented proxy device, a message directed to the server from a second user, wherein the message includes a request for information associated with a first user account that is associated with a first user, wherein the second user is different from the first user, and wherein the message comprises one or more graphics or images;

inspecting, by the computer-implemented proxy device, the message from the second user based on one or more pre-determined profiles and one or more pre-defined communication rules comprising a filter, wherein the inspecting comprises looking for data patterns in the one or more graphics or images in the message using the filter;

determining, based on the inspecting, that the message includes a request that violates a pre-defined communication rule for the second user;

in response to determining that the message includes the request that violates the pre-defined communication rule for the second user, filtering the message by the computer-implemented proxy device to produce a filtered message before sending the filtered message to the server; and in response to determining that the message includes a request for information that is restricted from the second user, generating a filtered return message and sending the filtered return message to the second user, wherein the filtered return message is generated by substituting dummy information for restricted information associated with the request.

17. The non-transitory computer-readable medium of claim 16, wherein the request comprises modifying the information associated with the first user account.

18. The non-transitory computer-readable medium of claim 16, wherein the request comprises creating or maintaining scripts to aggregate additional information included in inbound messages to the server.

19. The non-transitory computer-readable medium of claim 16, wherein the information associated with the first user account includes financial information of the first user.

20. The non-transitory computer-readable medium of claim 16, wherein the information associated with the first user account includes health information of the first user.

21. The non-transitory computer-readable medium of claim 16, wherein the computer-implemented proxy device is configured to log the message.

* * * * *